(12) United States Patent
Hahn et al.

(10) Patent No.: US 6,872,025 B2
(45) Date of Patent: Mar. 29, 2005

(54) TOGGLE RETAINER FOR TOGGLE CONNECTIONS

(75) Inventors: Detlef Hahn, Lunen (DE); Frank Fischer, Lunen (DE); Gerhard Merten, Lunen (DE); Ingo Pruss, Wuppertal (DE); Siegfried Schmidt, Bottrop (DE); Jorg Wirtz, Kamen (DE)

(73) Assignee: DBT GmbH, Lunen (DE)

( * ) Notice: Subject to any disclaimer, the term of this patent is extended or adjusted under 35 U.S.C. 154(b) by 61 days.

(21) Appl. No.: 10/326,760

(22) Filed: Dec. 19, 2002

(65) Prior Publication Data

US 2003/0118425 A1 Jun. 26, 2003

(30) Foreign Application Priority Data

Dec. 19, 2001 (DE) ..................................... 201 20 524 U

(51) Int. Cl.⁷ ................................................. F16D 1/00
(52) U.S. Cl. .................... 403/317; 403/315; 198/735.2
(58) Field of Search ................................ 403/315, 292, 403/294, 316, 317; 198/735.2, 735.6, 860.2, 861.2, 961.1

(56) References Cited

U.S. PATENT DOCUMENTS

| | | | | |
|---|---|---|---|---|
| 1,645,463 A | * | 10/1927 | Thomas ...................... | 403/312 |
| 4,588,072 A | * | 5/1986 | Braun et al. .............. | 198/735.6 |
| 4,733,771 A | * | 3/1988 | Grundken et al. ........ | 198/735.6 |
| 5,658,085 A | * | 8/1997 | Merten et al. .............. | 403/315 |
| 5,927,476 A | * | 7/1999 | Merten et al. ........... | 198/735.6 |
| 6,733,201 B2 | * | 5/2004 | Wack et al. ................. | 403/315 |
| 2001/0020570 A1 | * | 9/2001 | Schmidt et al. .......... | 198/735.6 |

* cited by examiner

*Primary Examiner*—John R. Cottingham
(74) *Attorney, Agent, or Firm*—Cook, Alex, McFarron, Manzo, Cummings & Mehler, Ltd.

(57) ABSTRACT

A toggle retainer (10) for toggle connections of conveyor pans (5) for chain scraper conveyors, guide troughs of mining machines and similar, with a locking plate (30) engaging across the locking extension (23, 24) on the toggle head (21, 22) of a toggle (20) and securing the toggle (20) in the toggle accepting pocket (9) against falling out to the side, both ends (31, 32) of which can be introduced into an insertion pocket (11, 12) in the toggle acceptor (1) and which for retention in the locking cut-outs (13, 14) of the toggle acceptor (1) have at least one aperture (37) into which the shaft (41) of a locking element (40) engaging in one of the locking cut-outs (13, 14) can be inserted. The locking plate (30) is provided with transverse borings (38, 39), one of which opens into the aperture (37) and in which a securing clamp (50) engagement can be inserted or is inserted retaining the shaft (41) by positive.

9 Claims, 3 Drawing Sheets

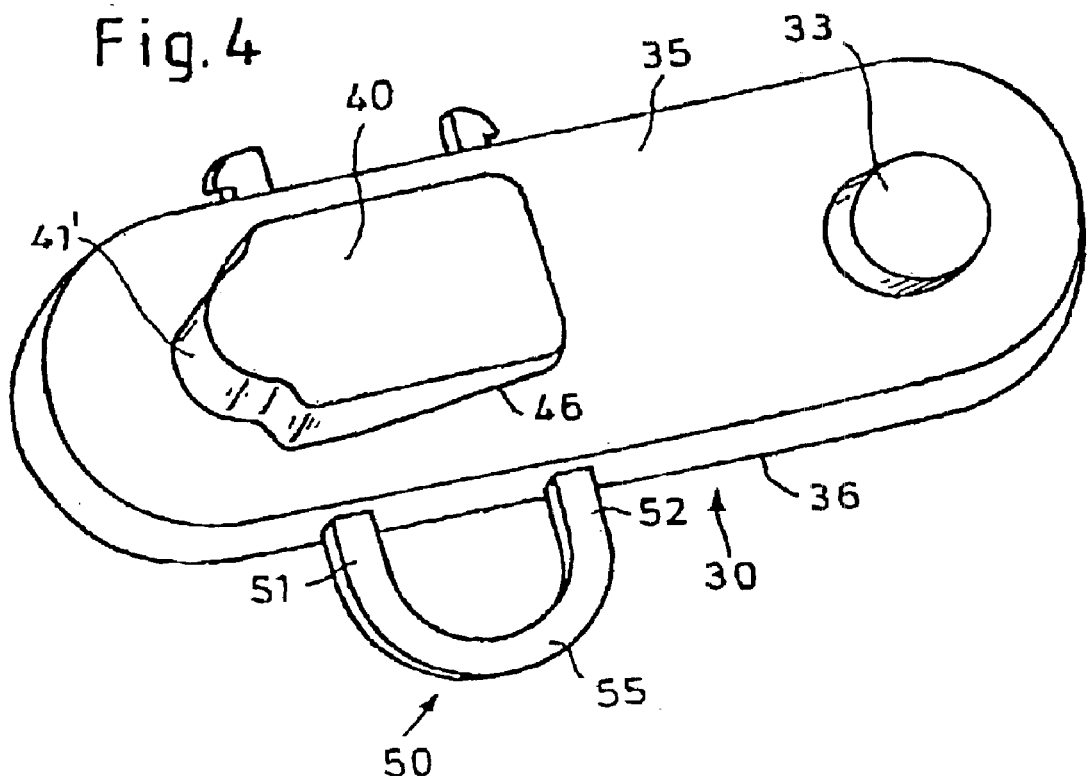
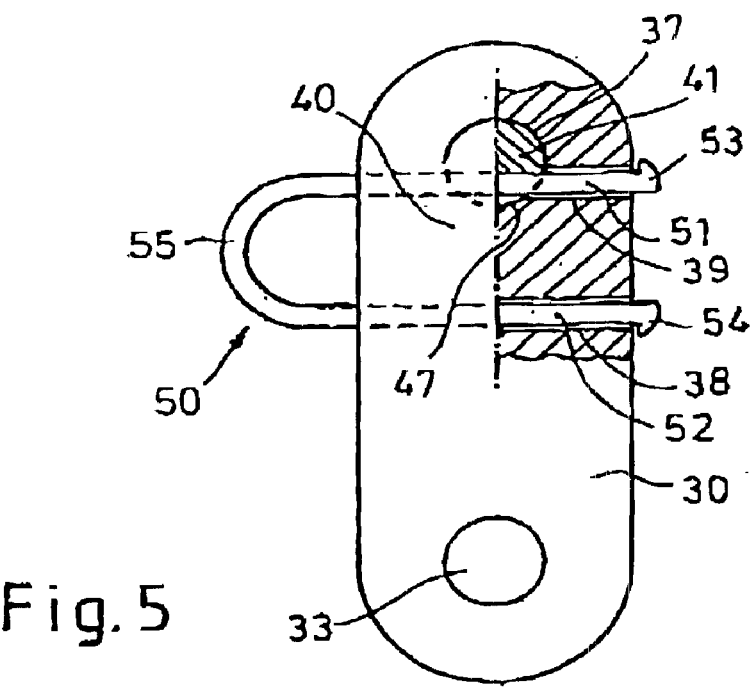

TOGGLE RETAINER FOR TOGGLE CONNECTIONS

The present invention relates to a toggle retainer for use with, but not exclusively, toggle connections of conveyor pans for chain scraper conveyors and guidance troughs for mining machine guides with a locking plate engaging across a locking extension on a toggle head of a toggle and securing the toggle in a toggle accepting pocket against falling out or to the side, both ends of which can be introduced into an insertion pocket in a toggle acceptor and which for retention in the locking cut-outs of the toggle acceptor have at least one aperture into which a shaft of a locking element engaging one of a plurality of locking cut-outs can be inserted.

The chain scraper conveyors and mining machine guides used in underground mining operations comprise individual conveyor pans, which are joined together by means of toggle connections so as to be strong in tension and with a limited angular mobility between each other, so that the chain scraper conveyors or mining machine guides can be moved in sections. The toggles, which effect the strong tension connection, are here inserted into accepting pockets, which are open to the side and secured in them by a toggle retainer against falling out sideways. The toggles supplied by the assignee have a broad bolt head with flat locking extensions on the axial toggle ends, which are each engaged by the detachable locking plate at right angles. In the assembled condition the preferably rounded ends of the detachable locking plate lie in a grooved insertion pocket on the toggle acceptor and the locking plate itself is secured in locking cut-outs in the accepting pocket by means of special securing means.

DE 295 02 953 proposes a toggle retainer in which the securing plate has at one end a hole for driving in a split collet and at the other end a hole for driving in a deformable plastics material pin. The plastics material pin is only driven in after the locking plate has reached its locking position. For disassembly the plastics material pin is deformed and destroyed. DE 100 11 288 U1 proposes a toggle retainer for a toggle connection in which both securing means are formed from detachable deformable plastics material bolts which can be inserted into open edged locking cut-outs. This construction offers the advantage of a very simple and quick assembly and disassembly. It has the disadvantage however that the plastics material bolts can tear under undue loading due to the unavoidable vibrations in underground applications.

It is an aim of the present invention to produce a toggle retainer which keeps the toggle reliably in the locked position and secures it against falling out and which can itself withstand heavy vibrations, Accordingly the present invention is directed to a toggle retainer as described in the opening paragraph of the present specification, in which the locking plate is provided with transverse borings, one of which opens into the aperture and into which a securing clamp can be inserted or is inserted for retaining the shaft by positive engagement. Owing to the use of a securing clamp for retaining the shaft of the locking element immediately on the locking plate, neither vibrations nor chance impulse-like impacts of rock falls or similar onto the locking plate can lead to a loosening of the locking plate, since for its securing no deformable parts are used. Losses of toggles are consequently no longer to be feared even under unfavourable circumstances. At the same time the retention and securing of the locking element can be undertaken quickly and easily, since the insertion and fastening of a securing clamp itself provides reduced problems even in underground restricted space conditions. A further advantage of the construction according to the present invention is that the securing clamp can be seen from outside indicating that the toggle bolts and the securing plate are secured against falling out.

In a preferred embodiment the locking element has a head part, which extends at right angles to the shaft. The head part hereby presents an enlarged assembly or disassembly surface. Advantageously the shaft of the locking element has a round cross section, whereby one of the shaft halves extends up to the upper side of the head part and forms a locking nose on the head part, which engages in an open edged first locking cut-out in the toggle acceptor. By the use of a suitable locking element consequently the retention of the locking plate in the locking cut-out of the toggle pocket is effected exclusively by positive locking and the forces introduced into the locking plate can be transmitted over the entire height of the locking element.

Preferably the shaft of the locking element is provided with a groove below and at a distance from the head for the engagement of one of the arms of the securing clamp. The groove can simply be formed on the shaft of the locking element in production. In contrast to a through boring this provision of a groove offers the further advantage that problems due to briquetting and adhesion of the arm of the securing clamp are smaller. In order the make the disassembly of the locking element easier following the loosening of the securing clamp, advantageously the head part can be provided with an incline extending out laterally on the underside of the end of the head part opposite to the shaft and the nose, onto which a lever tool for extracting the locking element can be applied during disassembly.

In a preferred embodiment the securing clamp is configured in a U-shape and has thickening or projections on the ends of the arms, which form retaining hooks and correspondingly retain the securing clamp against falling out from the lateral borings. The retaining hooks are for this purpose preferably directed outwardly in each case and the securing clamp itself has a small outwardly directed spring tension.

As has been explained further above, the present invention it is advantageous in that neither of the two locking ends of the securing plate is secured in the open edged locking cut-outs with a deformable securing means. The securing plate can equally well be constructed symmetrically about the central axis. Preferably the locking elements can be inserted and secured by means of a securing clamp to retain both the locking ends of the locking plate. In a preferred configuration of the toggle retainer, the locking plate is, alternatively, provided at a distance from the aperture with a stiff inherently stable pivoting and locking pin extending over both locking plate sides. Preferably the pivoting and locking pin is formed from a bolt firmly anchored in a boring or from pin ends, which extend and are integral with the locking plate sides.

An example of a toggle retainer made in accordance with the present invention will now be described hereinbelow in relation to the accompanying drawings, in which:

FIG. 4 shows a perspective plan view of a locking plate with an inserted locking element secured by means of a securing clamp; and FIG. 5 shows a partly sectioned plan view of the locking plate shown in FIG. 4.

Figure 1:
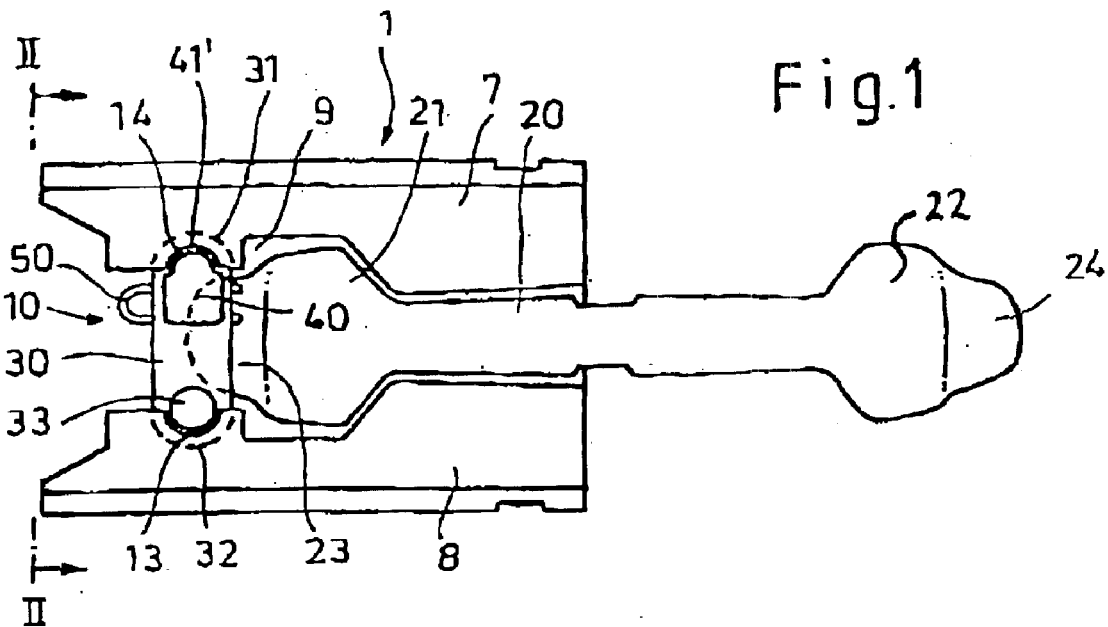
FIG. 1 shows a schematic side view of a toggle inserted into a toggle pocket and secured with a toggle retainer.
Figure 2:
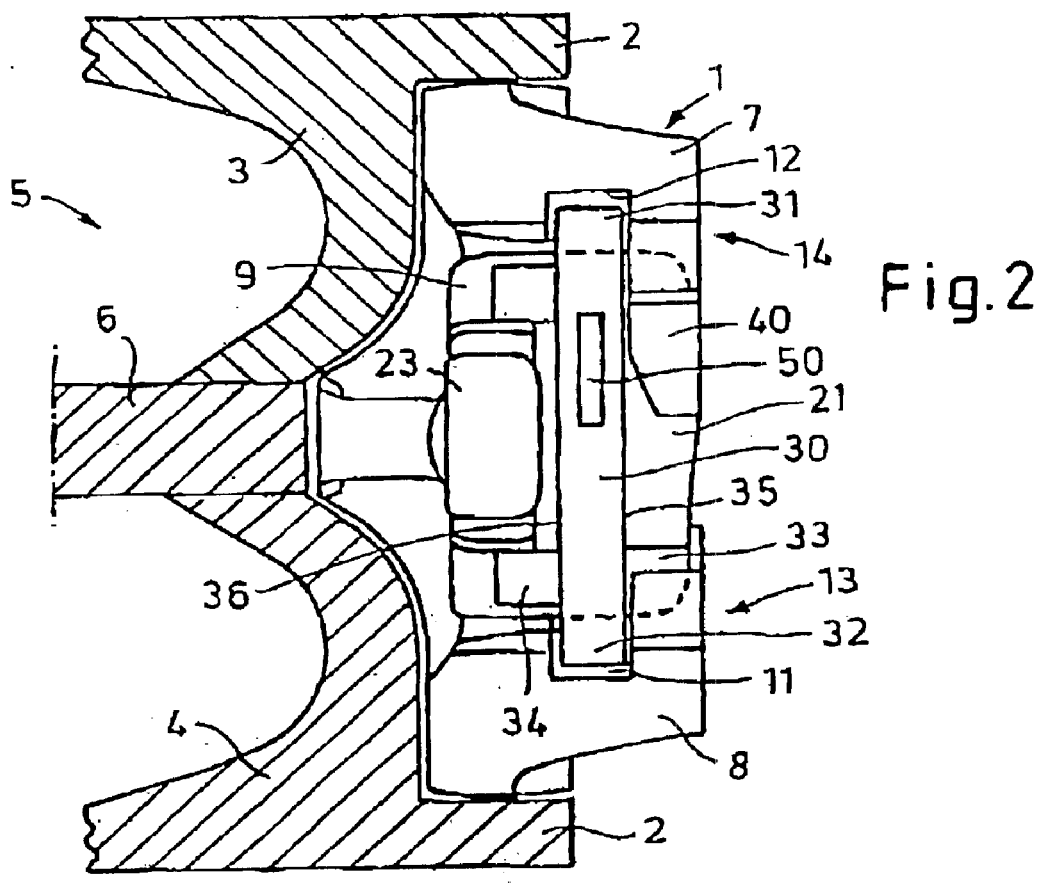
FIG. 2 shows a view corresponding to the line II—II in FIG. 1, whereby the toggle connection is shown assembled onto a conveyor pan.

In FIG. 1 and FIG. 2 a toggle acceptor 1 is welded between the profile webs 2 of the side profile 3, 4 of a conveyor pan 5. In the embodiment shown the two side profiles 3, 4 are welded onto the bottom sheet 6 of the conveyor pan 5. The toggle acceptor 1 has an upper toggle pocket part 7 and a lower pocket part 8 which are constructed as mirror images of each other and form a toggle accepting pocket 9 between them, in which one toggle head 21 of the toggle 20 is inserted. In the assembled condition, i.e. with two conveyor pans joined in tension with each other, the right hand toggle head 22 in FIG. 1 lies in an associated toggle pocket of a conveyor pan or guide trough connecting at the conveyor pan joint. The toggle 20 has at both toggle heads 21, 22 a flat and possibly multiply stepped locking extension 23, 24 forming the axial ends of the toggle 20, which has a noticeably lower height than the toggle head 21, 22 joining onto it. Whilst the thick toggle heads 21, 22 must be able to accept the forces arising in the axial direction of the guide trough during the movement of the chain scraper conveyor and the mining travel of the mining machine, the locking extensions 23, 24 serve exclusively for the retention of the toggle 20 against sideways falling out from the toggle acceptor 1 and from the toggle accepting pocket 9 formed from this.

Figure 3:
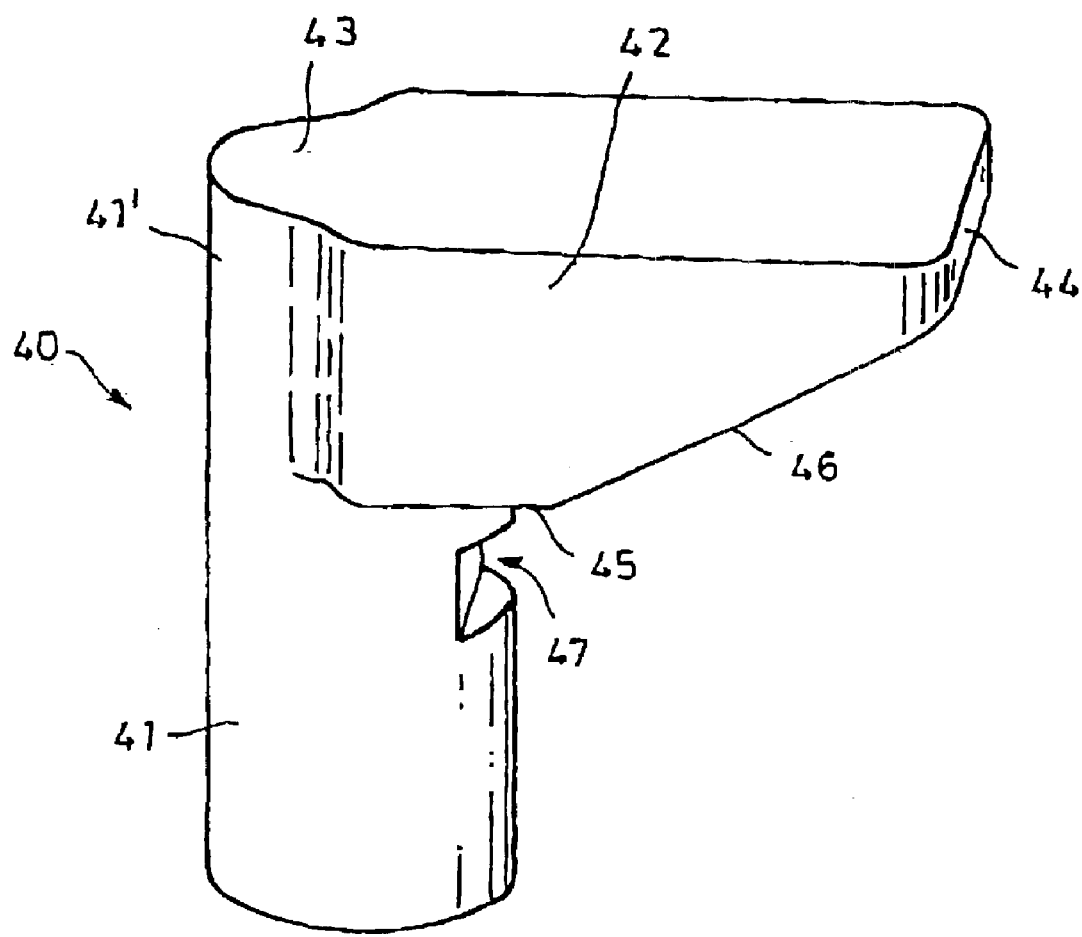
FIG. 3 shows a perspective view of the locking element of the toggle retainer.

The toggle retainer of the toggle 20 in the toggle acceptor 1 is formed from the multi-part toggle retainer 10 which is shown in detail in FIGS. 3 to 5 and whose construction is still to be explained with reference to these Figures. The toggle retainer 10 comprises inter alia of an elongate locking plate 30 shown in the embodiment with rounded ends 31, 32 which engage in groove shaped insertion pockets 11, 12 open into the toggle acceptor pocket 9, as can be seen in FIG. 2 which engages across the locking extension 23 of the toggle 20. To secure the locking plate 30 on the toggle acceptor 1 and its toggle pocket side parts 7, 8, the latter are provided in each case with an open edge and approximately semi-circular locking cut-out 13, 14, which extends both above and also below the insertion pockets 11, 12. Locking and pivoting pins 33, 34 formed on the locking plate 30 engage in the lower locking cut-out 13 shown in FIGS. 1 and 2. The locking and pivoting pins 33, 34 can be formed from a metal pin inserted in a boring in the locking plate 30 or from integral pin ends extending out above the locking plate sides 35, 36. The locking and pivot pins 33, 34 are inherently stable, matched to the curvature of the locking cut-out 13 and lock the locking plates 30 at their lower ends 32 to the toggle cut-out 13 or the lower insertion pocket 11. If the locking and pivoting pins 33, 34 are formed from a metal bolt, this can be driven into the associated boring with a pressure fit. For the retention of the locking plate 30, a detachable locking element 40 is provided whose construction is now further explained with reference to FIGS. 3 to 5.

The locking element 40 has a several centimeter long round shaft 41 and formed on one side of this an integral and sideways extending head part 42. As can well be seen from FIG. 3, the shaft 41 extends on its rear, half up to the upper side 43 of the head part 42 and forms a locking nose 41 which can engage with a positive engagement in the upper locking cut-out 14 (FIG. 1), in order to secure the locking plate 30 in the locking position.

The head part 42 extending away from the locking nose 41' to the end of the head part 42 has an underside 45 immediately on the shaft 41, extending at right angles to the central axis of the shaft 41 and an incline 46 continuing from it onto which a tool, especially a lever, can be applied for dismounting the locking element 40. Owing to the incline 46, a tool engagement gap is formed in the assembled condition, between the upper side 35 of the locking plate 30 and the head part 42. The diameter of the round shaft 41 of the locking element 40 is dimensioned such that the shaft 41 can be inserted with minimum play in an aperture 37 configured as a boring in the locking plate 30, as FIG. 5 shows clearly. Further, the shaft 41 has a groove 47 at a minimum distance from the straight underside 45 of the head part 42, in which in the assembled condition one arm 51 of the somewhat U-shaped securing clamp 50, which has two arms 51, 52, engages. The two arms 51, 52 of the securing clamp 50 plug into two transverse borings 38, 39 within the locking plate 30, whereby the transverse boring 39 opens into the aperture 37 for the arm 51. The arm 51 of the securing clamp 50 also therefore engages in the locked condition in the groove 47 on the shaft 41 with positive engagement and secures the locking bolt 40 against falling out. It is understood that for this the distance of the groove 47 from the flat underside 45 and the dimension of the groove 47 to the dimension of the locking plate 30 and the position of the transverse boring 39 in the locking plate 30 are matched.

The securing clamp 50 itself is secured in or on the cross borings 38, 39 by means of hook shaped extensions 53, 54 on the ends of the arms 51, 52. Since the arms 51, 52 are pre-tensioned against the round clamping arch 55, the arms 51, 52 can be removed from the transverse borings 38, 39 only with a simultaneous pressing together of both arms 51, 52.

The assembly of the toggle retainer formed from the locking plate 30, the locking bolt 40 and the securing clamp 50 occurs following the insertion of the toggle 20 into the toggle acceptor 1 which is open to the side. The locking plate 30 is then first positioned with the lower lock and pivot pins 33, 34 in the lower locking cut-out 13 and brought into their vertical final position. Then the shaft 41 of the locking element 40 is inserted such that the nose 41 of the locking bolt 40 engages in the upper locking cut-out 14 with a positive engagement. Only in this position can the securing clamp 50 engage through the cross borings through the locking plate 30 and secure the locking bolt 40 in the locked position. The toggle 20 is then secured against falling out to the side.

For the specialist a number of modifications, will become obvious from the foregoing description, which must fall within the area of protection of the claims. The apertures in the locking plate 40 and the cross section of the shaft of the locking bolt 40 can deviate from a circular cross section and could be oval, square or similar. The shaft of the locking bolt could also engage in a boring in the toggle pocket side parts. Such and other modifications should fall within the area of protection of the attached claims.

What is claimed is:

1. A toggle retainer for use with, toggle connections of conveyor pans for chain scraper conveyors, and guide troughs of mining machines with a locking plate engaging across a locking extension on a toggle head of a toggle and securing the toggle in a toggle accepting pocket against falling out or to the side, both ends of which can be introduced into an insertion pocket in a toggle acceptor and which for retention in the locking cut-outs of the toggle acceptor have at least one aperture into which a shaft of a locking element engaging in one of a plurality of locking cut-outs can be inserted, in which the locking plate is provided with transverse borings, one of which opens into the aperture and in which a securing clamp engagement can be inserted or is inserted for retaining the shaft by positive.

2. A toggle retainer according to claim 1, in which the locking element has a head part which extends at right angles to the shaft.

3. A toggle retainer according to claim 1, in which the shaft of the locking element has a round cross section, whereby one of the shaft halves extends up to the upper side of the head part and forms a locking nose on the head part, which engages in an open edged first locking cut-out in the toggle acceptor.

4. A toggle retainer according to claim 2, in which the shaft of the locking element is provided with a groove below and at a distance from the head for the engagement of one of the arms of the securing clamp.

5. A toggle retainer according to claim 2, in which the head part is provided with an incline extending out laterally on the underside of the end of the head part opposite to the shaft and the locking nose.

6. A toggle retainer according to claim 1, in which the securing clamp is formed in a U-shape and is provided at the ends of the arms with retaining hooks formed from thickenings or protrusions.

7. A toggle retainer according to claim 1, in which the locking plate is provided at a distance from the aperture with a stiff inherently stable pivoting and locking pin extending out over both locking plate sides.

8. A toggle retainer according to claim 7, in which the pivoting and locking pin is formed from a firmly anchored bolt or from integral pin attachments.

9. A toggle retainer according to claim 7, in which the shaft of the locking element has a round cross section, whereby one of the shaft halves extends up to the upper side of the head part and forms a locking nose on the head part, which engages in an open edged first locking cut-out in the toggle acceptor.

* * * * *